United States Patent [19]

Ono

[11] Patent Number: 4,905,270

[45] Date of Patent: Feb. 27, 1990

[54] VEHICULAR HANDS-FREE TELEPHONE SYSTEM

[75] Inventor: Hideyo Ono, Amagasaki, Japan

[73] Assignee: Mitsubishi Denki Kabushiki Kaisha, Tokyo, Japan

[21] Appl. No.: 284,412

[22] Filed: Dec. 14, 1988

[30] Foreign Application Priority Data

Dec. 18, 1987 [JP] Japan .................................. 62-193246
Jun. 27, 1988 [JP] Japan .................................. 63-156957

[51] Int. Cl.$^4$ .............................................. H04Q 7/04
[52] U.S. Cl. ......................................... 379/58; 455/90; 379/428
[58] Field of Search .................... 379/56, 63, 58, 428; 455/127, 90

[56] References Cited

U.S. PATENT DOCUMENTS 3,844,840 10/1974 Bender ................................ 455/127
4,698,838 10/1987 Ishikawa et al. ...................... 379/58
4,706,273 11/1987 Spear et al. .......................... 379/58
4,715,063 12/1987 Haddad et al. ...................... 379/390

FOREIGN PATENT DOCUMENTS 203359 12/1982 Japan .
1255297 12/1971 United Kingdom .
2196210 4/1988 United Kingdom .

*Primary Examiner*—Robert Lev
*Attorney, Agent, or Firm*—Fleit, Jacobson, Cohn, Price, Holman & Stern

[57] ABSTRACT

A voice of user is picked up by a microphone built in a sun visor of a vehicle. The output of microphone is frequency-modulated by an FM transmitter powered by a solar battery and transmitted through a transmitting antenna in a vehicle. The frequency-modulated radio signal is received and demodulated by a receiver with a receiving antenna. The received signal is further transmitted outside of the vehicle through a transceiver.

14 Claims, 7 Drawing Sheets

VEHICULAR HANDS-FREE TELEPHONE SYSTEM

BACKGROUND OF THE INVENTION

This invention relates to a vehicular hands-free telephone system mounted in a vehicle such as an automobile.

FIG. 10 shows the mounting in a passenger vehicle of a prior-art hands-free telephone apparatus. In the drawing, the reference numeral 1 denotes the passenger vehicle, which has a transceiver 2 mounted in its trunk. An antenna 3 is mounted on the roof of the passenger vehicle 1 and connected to the transceiver 2 by an antenna cable 3a. The numeral 4 denotes an automobile battery which is connected to the transceiver 2 by a power cable 4a and supplies power to the transceiver 2. A phone base 5 is installed near the driver's seat in the passenger vehicle 1, and is connected to the transceiver 2 by a control cable 5a. The top of the phone base 5 is provided with a handset cradle, on which a handset 6 is placed. The handset 6 is connected to the phone base 5 by a curled cord 6a. A speaker 7 for hands-free communication is also installed in the cabin of the passenger vehicle 1 and is connected to the phone base 5 by a speaker cable 7a. A microphone 9 is mounted on the sun visor 8 and is connected to the phone base 5 by a microphone cable 9a.

FIG. 11 is a perspective drawing providing a more detailed view of the mounting in the vicinity of the driver's seat described in FIG. 10.

FIG. 12 is a block diagram of the prior-art hands-free telephone apparatus, in which the reference numeral 11 denotes a regulated power-supply circuit, 12 is an analog switch for switching between a handset mode in which the conversation is carried via the handset 6 and a hands-free mode in which the conversation is carried via the microphone 9 and speaker 7, 13 is a hook switch for switching in accordance with the placement of handset 6, and 14 is a logic circuit for decoding the status of keys 61 in the handset 6, sending display commands to a display device 62, exchanging display data with the transceiver 2, processing the data, monitoring the state of the hook switch 13, and controlling the switching of the aforementioned analog switch 12. The reference numeral 15 denotes a transmit amplifier for amplifying the signal received from the mouthpiece 63 in the handset 6 to a required level, and 16 is an interface circuit for amplification or attenuation to a level optimal for the operation of the earpiece 64 in the handset 6. The reference numeral 17 denotes a transmission control circuit for comparing the transmit level of the outgoing voice signal from the microphone 9 with the level of the incoming voice signal in the hands-free mode and controlling howling and abnormal fluctuations in voice level to optimize the hands-free telephone operation. The operation of the transmission control circuit 17 is well known and will not be further described herein.

Next the operation of the apparatus will be described. The basic operation of the transceiver 2 of the automobile telephone system is general knowledge so it will not be described here, but it will be assumed that power and the incoming voice signal are transferred from the transceiver 2 to the phone base 5, the outgoing voice signal is transferred from the phone base 5 to the transceiver 2, and the transceiver 2 and the phone base 5 exchange data, if necessary.

When the handset 6 is resting on the phone base 5, if a key 61 on the handset 6 is pressed to designate the hands-free mode, the logic circuit 14 reads the status of the hook switch 13 and the key 61, indicating that the handset 6 is resting on the phone base 5 and that the hands-free mode is designated, and sets switches in the analog switch 12 to the hands-free mode in which the outgoing voice signal armature is connected to the contact 12a and the incoming voice signal armature is connected to the contact 12c. The hands-free microphone 9 is connected by the microphone cable 9a so that it receives power from the phone base 5 and sends its output to the phone base 5. To prevent howling the speaker 7 is located as far as possible from the microphone 9, although still within easy hearing range of the person using the telephone. More specifically, to prevent the sound output from the speaker 7 from entering the microphone 9 directly at a high volume level, the speaker 7 is positioned so that the output level will at least be lower than the level of voice input to the microphone 9. For hands-free operation it is therefore desirable to have the microphone 9 located near the hands-free person's mouth. Mounting the microphone 9 on the sun visor 8 is already widely employed as a means of bringing the microphone 9 as close as possible to hands-free person's speaker's mouth. The voice signal picked up by the microphone is sent to the transmission control circuit 17, which compares it with the incoming voice signal from the transceiver 2 and applies control so that the gain of the closed loop created when the acoustic output of the speaker 7 is picked up by the microphone 9 and transmitted to the other party's speaker, then is picked up by the other party's microphone and returns to the speaker 7 is less than unity, so that howling does not occur. For example, the transmission control circuit 17 may apply control to optimize the operation of the hands-free mode by attenuating the receive level when the transmit level is higher and attenuating the transmit level when the receive level is higher.

Thus for the hands-free operation to function smoothly it is essential that the hands-free microphone 9 be placed as close as possible to the hands-free person's mouth.

An example of prior art differing from that described above is given in Japanese Patent Laid-open No. 203359/1982, in which the objective of situating the microphone as close as possible to the hands-free person's mouth is accomplished by providing a transducer for converting an acoustic signal to an electrical signal in the frame of a pair of glasses.

Problems occurring in a prior-art hands-free telephone apparatus configured as described above include, in the case of apparatus having a microphone 9 mounted in the frame of a pair of glasses as in Japanese Patent Laid-open No. 203359/1982, high cost and the inconvenience of having to wear and operate the apparatus, and in the case of apparatus in which the microphone 9 is provided in the sun visor 8 as in FIGS. 6, 7, and 8, the trouble of having to install a microphone cable to connect the microphone 9 to the phone base 5, the possibility of entanglement because this cable runs partly under the driver's feet, and the aesthetic problem that the cable is exposed to view.

SUMMARY OF THE INVENTION

An object of this invention is to solve such problems as the above.

Another object of this invention is to provide a hands-free telephone system in which the cable interconnection between the microphone and the phone base can be eliminated, and the inconvenience and hazards of a body-worn system can also be eliminated.

According to the invention, there is provided a vehicular hands-free telephone apparatus comprising
 a microphone for converting an acoustic signal to an electrical signal,
 an FM transmitter for generating a frequency-modulated radio signal in response to the output of said microphone,
 a transmitting antenna for transmitting in a vehicle said radio signal generated from said FM transmitter,
 a solar battery for converting light energy to electrical energy and providing operating power to said FM transmitter,
 a receiving antenna for receiving said radio signal transmitted from said transmitting antenna,
 a receiver for receiving and frequency-demodulating said radio signal received by said receiving antenna, and
 a transceiver for transmitting the output of receiver outside of said vehicle.

This invention provides an apparatus in which the microphone cable of the prior art is eliminated and the system need not be body-worn, as a result of which the system is not inconvenient to operate, does not necessitate inconvenient body-wearing, is aesthetically pleasing, and does not create the problem of a cable running under the driver's feet.

DETAILED DESCRIPTION OF THE PREFERRED EMBODIMENT

Figure 1:
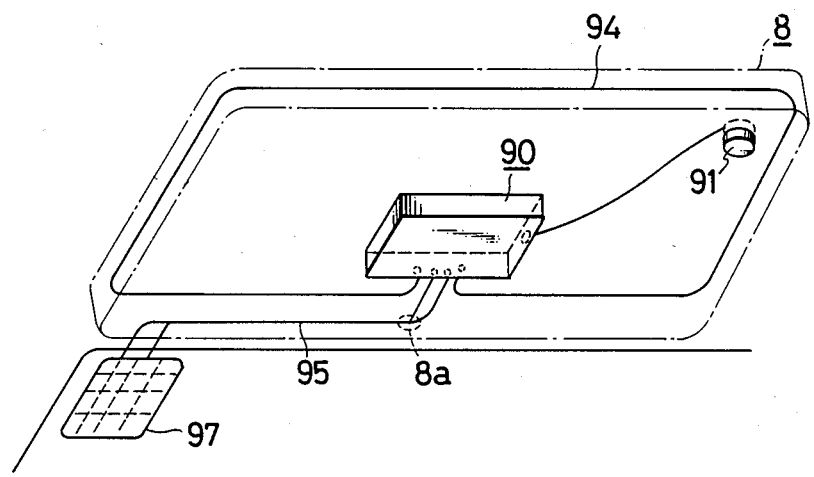
FIG. 1 is a perspective drawing showing the mounting of the FM transmitter in a hands-free telephone apparatus according to the first embodiment of the invention.

An embodiment of this invention will be described with reference to the drawings. In FIG. 1, the reference numeral 97 denotes a solar battery, and 94 denotes a transmitting antenna made of a metal with good electrical conductivity that also forms the inner frame of a sun visor 8. The reference numeral 90 denotes an FM transmitter that has the function of generating and transmitting a frequency-modulated radio signal in accordance with the signal from the microphone 9. The FM transmitter 90, the microphone 9, and the antenna 94 are mounted inside the sun visor 8, while the solar battery 97 is connected to the FM transmitter 90 by an insulated cable 95 which runs through a hole 8a in the sun visor 8 disposed in an area of weak electric field strength, such as the area around the power feeding point of the antenna 94. At least that part of the sun visor 8 disposed in front of the microphone 9 is made of a permeable material that does not obstruct acoustic input.

Figure 2:
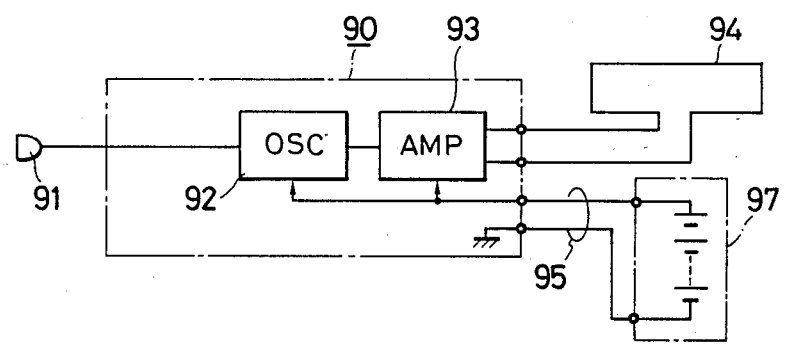
FIG. 2 is a block diagram showing the FM transmitter in a hands-free telephone apparatus according to the first embodiment of the invention.

FIG. 2 is a block diagram of the FM transmitter 90 which transmits the frequency-modulated signal, in which as the microphone 9 an electret capacitor (EC) microphone 91 is employed for converting an acoustic signal to an electrical signal. A highly directional EC microphone is usually employed in a hands-free telephone. The reference numeral 92 denotes an oscillator for generating a frequency-modulated radio signal in response to the output of the microphone 91, and 93 denotes a buffer amplifier for rejecting higher harmonics in the output of the oscillator 92 and amplifying the output to the necessary level. The reference numeral 94 denotes a transmitting antenna, a loop antenna in this case, for emitting the output of the FM transmitter 90 as a radio signal. The power generated by the solar battery 97 is supplied to the oscillator 92 and the buffer amplifier 93 through the code 95.

Figure 3:
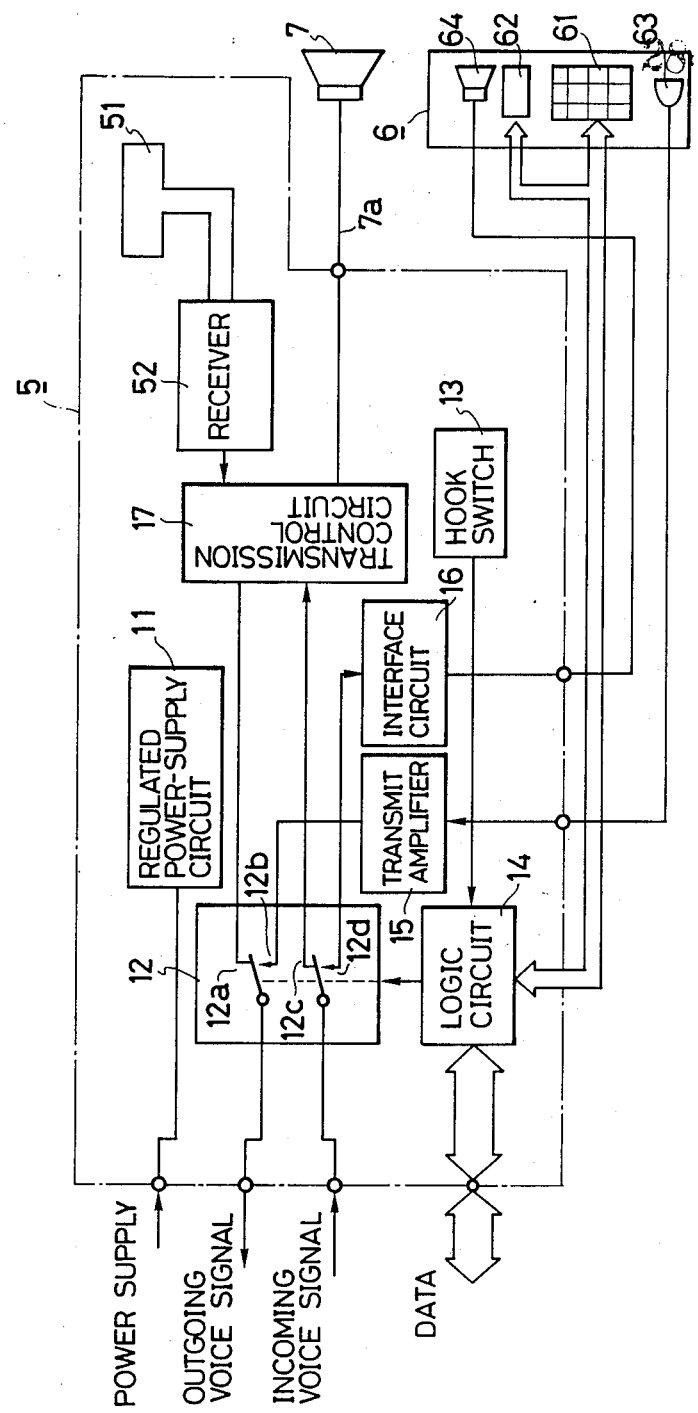
FIG. 3 is a block diagram showing the hands-free telephone apparatus according to the first embodiment of the invention.

FIG. 3 is a block diagram of the phone base 5 in this invention, in which a receiver 52 is connected to the input side of the transmission control circuit 17 and a receiving antenna 51 is connected to the input terminal of the receiver 52. The other blocks are the same as in the prior-art example. The receiving antenna 51 may be a loop antenna mounted inside the phone base 5, or another type of antenna.

Figure 12:
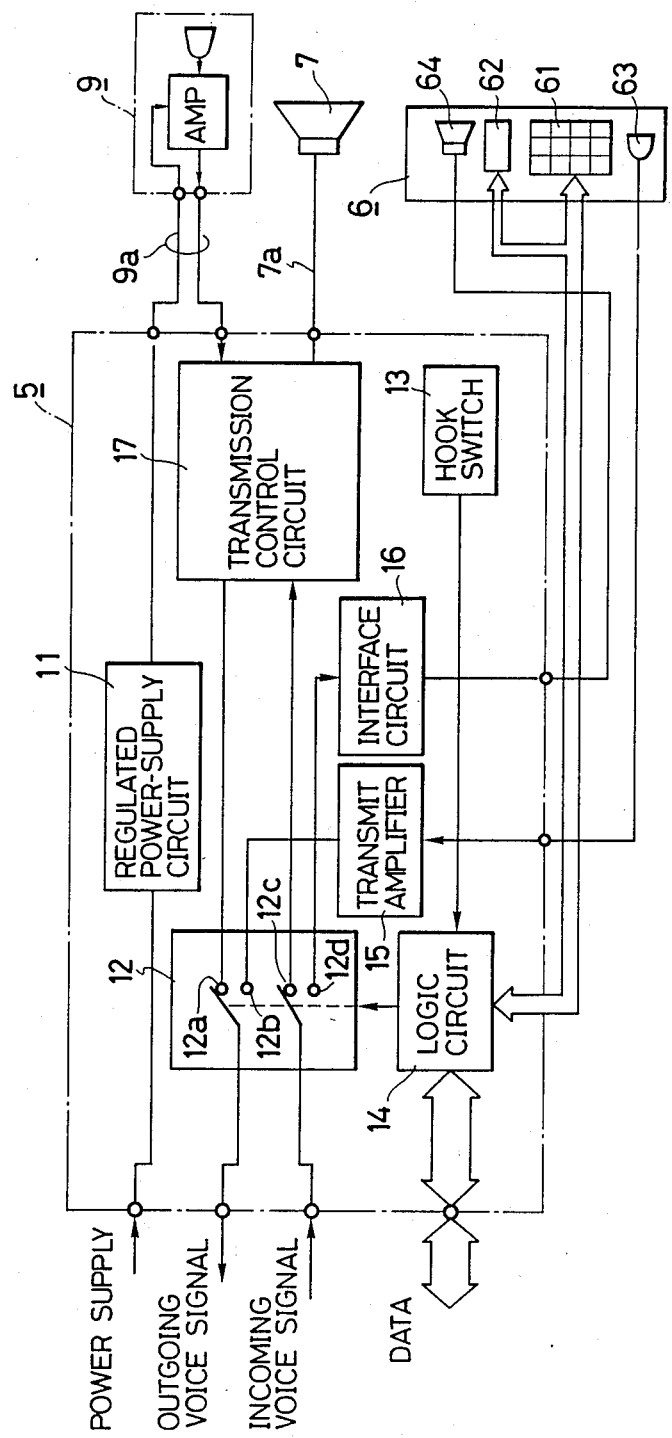
FIG. 12 is a block diagram showing the prior-art hands-free telephone apparatus.

The phone base 5 should if possible be disposed in a location with an unobstructed line-of-sight toward the transmitting antenna 94 in the sun visor 8. For example, the location shown in FIG. 12 is adequate.

Next the operation will be described. When the person using the telephone makes an utterance, his voice is picked up by the microphone 91 and converted to an electrical signal, from which the oscillator 92 generates a frequency-modulated RF signal. This RF signal is amplified to the required level by the buffer amplifier 93, the output stage of which is normally provided with a resonant circuit (not shown in the drawings) that removes higher harmonics. The output of the FM transmitter 90 is brought to the transmitting antenna 94 and transmitted at a level adjusted to the weak radio signal level (of 15 dB$\mu$V/m or less at a distance of 100 m). The solar battery 97 converts light energy to electrical energy which it supplies to the FM transmitter 90. The FM transmitter 90 consumes at most 50 mW of power, so in practice an area of 5 cm $\times$ 5 cm is adequate for the solar battery 97. The phone base 5 is located at a distance of only about 2 m from the FM transmitter 94, so the output of the FM transmitter 90 can be extremely weak. The receiving antenna 51 in the phone base 5 captures the radio signal from the FM transmitter and applies it to the receiver 52, which demodulates it and sends it to the transmission control circuit 17 as the hands-free person's voice signal. Since the receiver 52 is an FM demodulator it generates noise when no signal is present, but this can be suppressed by adding for instance a squelch circuit. Other respects of the hands-free telephone operation are the same as in the prior-art example.

As can be seen from FIG. 1, the FM transmitter 90 is mounted on the sun visor 8 so that the microphone 91 faces the user(usually the driver). The solar battery is mounted on the windshield in a position that does not block the driver's field of view.

The radio signal emitted from the FM transmitter 90 inside the vehicle is innately weak and is attenuated by 10dB or more outside the vehicle due to the shielding effect of the vehicle body, so it is unlikely to interfere with devices exterior to the vehicle.

Figure 4:
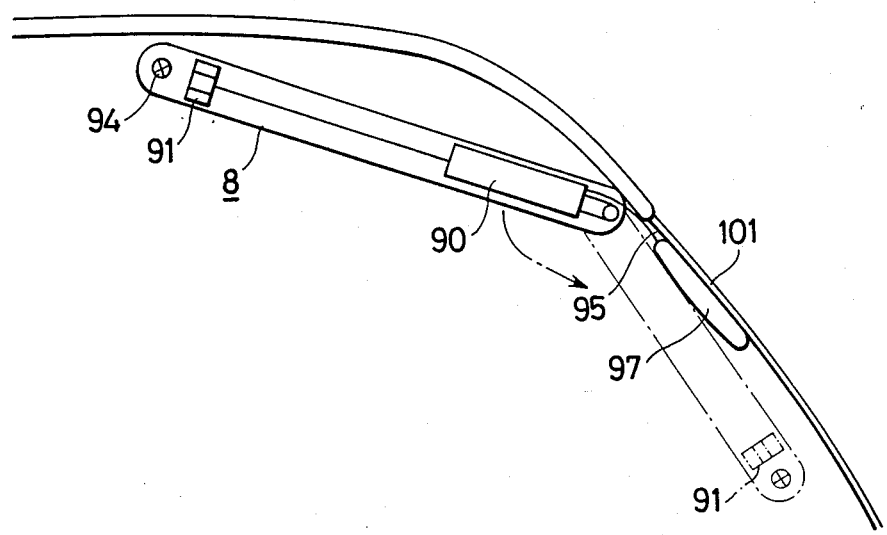
FIG. 4 shows a cross-sectional view of the mounting of the FM transmitter in a hands-free telephone apparatus according to the second embodiment of the invention.

FIG. 4 is a block diagram of another embodiment of the this invention, in which the dash-dot line shows the position of the sun visor 8 when it is lowered to provide shading from the sun's rays. If the microphone 91 is a undirectional device as in FIG. 1, when the sun visor 8 is lowered to the position of the dash-dot lines the microphone 91 will face the windshield 101 and the level of acoustic input to the microphone 91 will be reduced, creating a difficulty for hands-free operation.

This difficulty can be solved by using a noise-canceling type of microphone 91 with both forward and rear directionality, and this embodiment can maintain its performance even when the sun visor 8 is lowered, and can provide good communication by canceling ambient noise.

Figure 5:
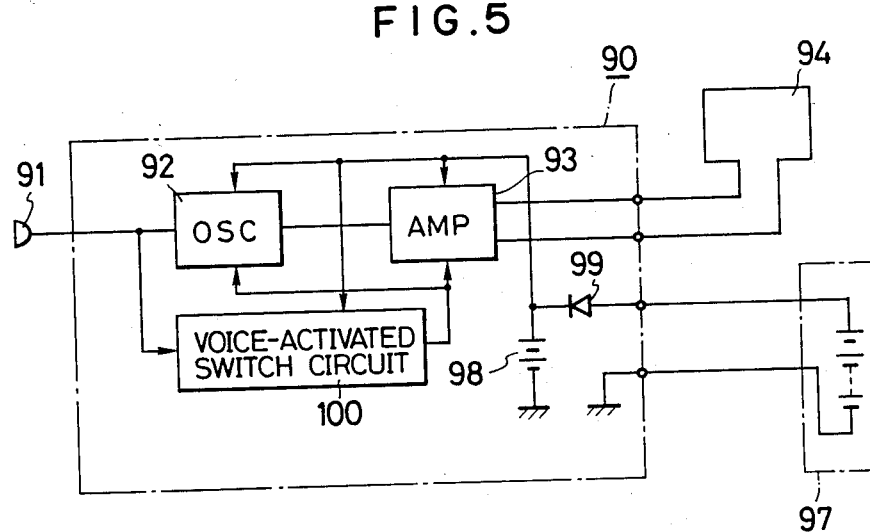
FIG. 5 is a block diagram of the FM transmitter according to the third embodiment of the invention.

FIG. 5 is a block diagram showing another embodiment of the FM transmitter 90. The reference numeral 100 in FIG. 5 denotes a voice-activated switch circuit (VOX circuit) provided in the FM transmitter 90. The hands-free person's voice is converted by the microphone 91 to an electrical signal which is detected by the VOX circuit 100, and control is applied so that the buffer amplifier 93, hence the FM transmitter 90, operates only while this signal is detected.

98 is a secondary battery built into the FM transmitter 90 which is charged by power from the solar battery 97 through a reverse current blocking diode 99 and supplies power to the oscillator 92, the buffer amplifier 93, and the VOX circuit 100. During the daytime, the solar battery 97 provides operating power to the FM transmitter 90 and charges the second battery 98, through the code 95 and the diode 99, respectively. At night or in locations such as tunnels where no external light is available the FM transmitter 90 is powered by the secondary battery 98. Accordingly, in this embodiment it is possible to restrict current drain from the secondary battery 98 when the hands-free telephone is not in use.

Figure 6:
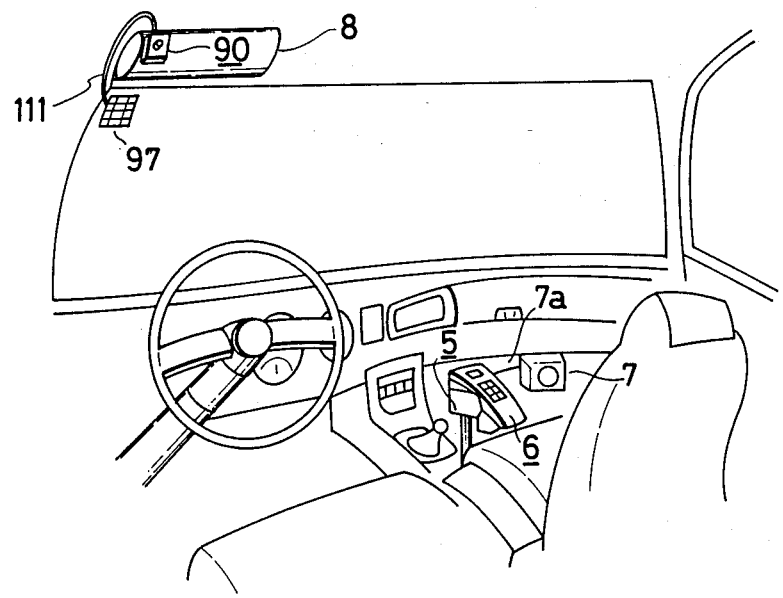
FIG. 6 is a perspective drawing of the disposition of equipment in the vicinity of the driver's seat of a hands-free system according to the fourth embodiment of the invention.
Figures 10, 11:
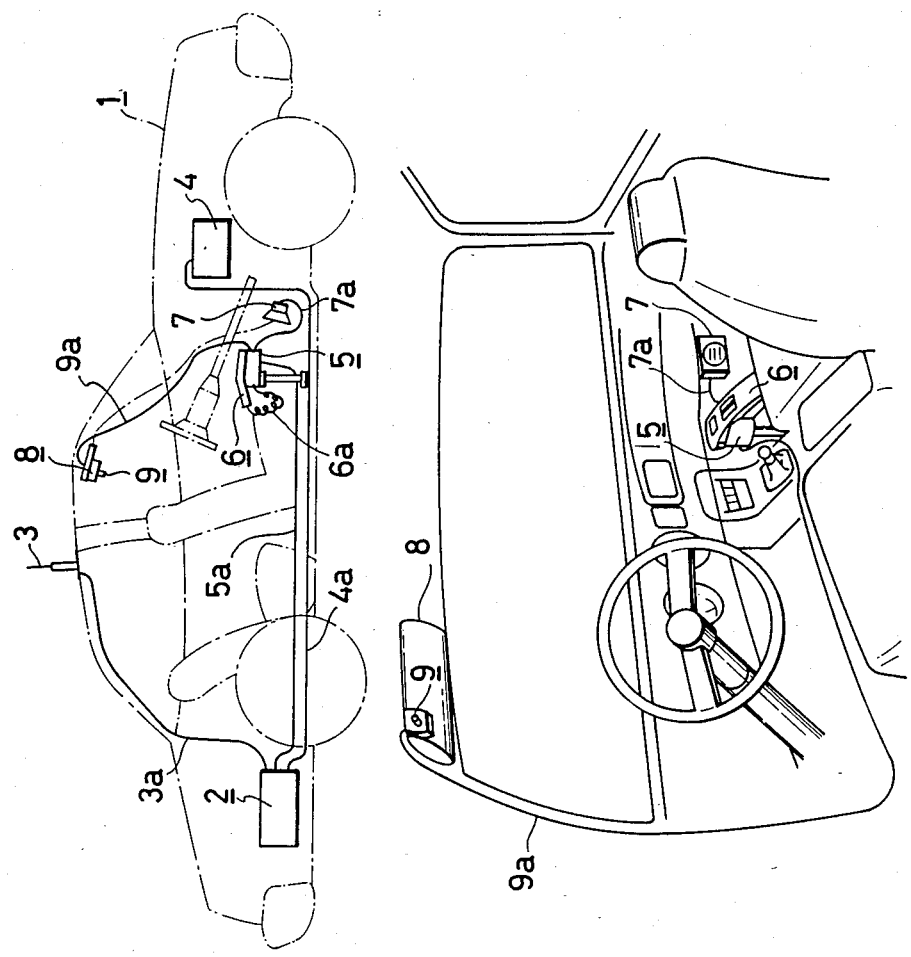
FIG. 10 shows the mounting of a prior-art automobile telephone apparatus with a hands-free telephone.
FIG. 11 gives a more detailed oblique view of the mounting shown in FIG. 10.

FIG. 6 is a perspective drawing showing the mounting of a hands-free telephone apparatus according to another embodiment of this invention in the vicinity of the driver's seat in greater detail. 111 is a paired transmission cable connected between the FM transmitter 90 and the solar battery 97. The mounting of other devices in the automobile is the same as in the example of the prior art shown in FIG. 11.

Figure 7:
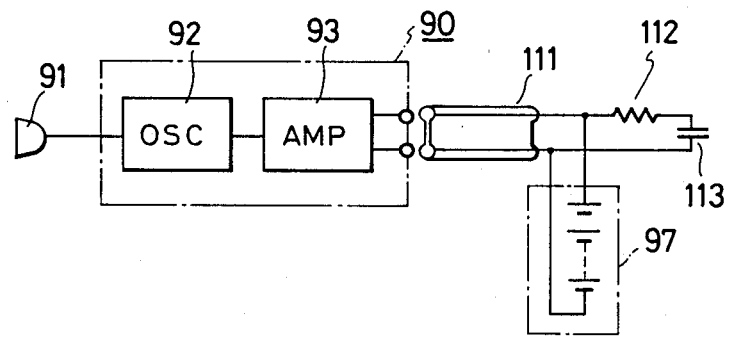
FIG. 7 is a block diagram of the FM transmitter in a hands-free telephone apparatus according to the fourth embodiment of the invention.

FIG. 7 is a block diagram showing the system for transmitting the frequency-modulated radio signal. The leakage-type paired transmission cable 111 functions as the antenna 94 for emitting a radio signal according to the output from the FM transmitter 90, and is terminated at its end by a terminating resistor 112 matched to the impedance of the paired transmission cable 111. The numeral 113 denotes a DC blocking capacitor selected as having a sufficiently small impedance value at the frequency of the emitted radio signal. Since the radiated power is extremely low, miniature surface-mounted components which can be easily installed on the paired transmission cable are used for the terminating resistor 112 and the DC blocking capacitor 113. The solar battery 97 is also connected to the paired transmission cable 111 at its end. If the impedance of the solar battery 97 adversely effects the impedance matching of the paired transmission cable 111 at the frequency of the emitted radio signal, the paired transmission cable 111 can be adjusted to a different length. It is also possible to insert a reactance between the paired transmission cable 111 and the solar battery 97 so that the impedance as seen from the former looking toward the latter is negligibly small, although such a reactance is not indicated here.

In this configuration, the person's voice is picked up by the microphone device 91 and converted to an electrical signal, from which the frequency-modulated oscillator 92 generates a frequency-modulated rf signal. This RF signal is amplified to the required level by the buffer amplifier 93, the output stage of which is normally provided with a resonant circuit that removes higher harmonics. The output is brought to the paired transmission cable 111 which is used as a leakage transmission cable, the leakage level being adjusted to the weak radio signal level (of, for instance, 15 dBµV/m or less at a distance of 100 m). The output of the FM transmitter 90 is captured by the phone base 5 shown in FIG. 3.

As can be seen from FIG. 6, the FM transmitter 90 is ordinarily mounted on the sun visor 8 so that the microphone surface faces the user (usually the driver). The solar battery 97 is mounted on the windshield 101 in a position that does not block the driver's field of view. The radio signal emitted from the FM transmitter 90 inside the vehicle is innately weak and is attenuated by 10 dB or more outside the vehicle due to the shielding effect of the vehicle body, so it is unlikely to interfere with devices exterior to the vehicle.

Figure 8:
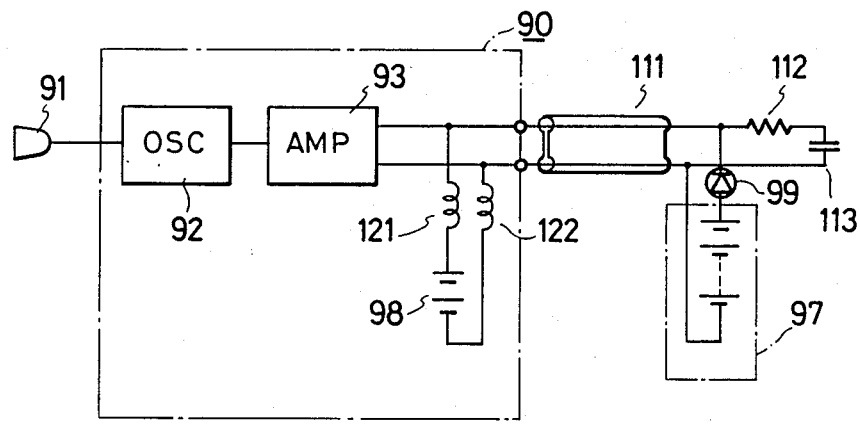
FIG. 8 is a block diagram of the FM transmitter in a hands-free telephone apparatus according to the fifth embodiment of the invention.

FIG. 8 is a block diagram of yet another embodiment of the FM transmitter. The reference numerals 121 and 122 denote reactances inserted to make the high-frequency impedance seen from the output side of the FM transmitter looking toward the secondary battery 98 negligibly small. The secondary battery 98 is connected so as to be charged by the solar battery 97 through the reactances 121 and 122. In this configuration, during the daytime, the solar battery 97 provides operating power to the FM transmitter 90 and charges the secondary battery 98, through the pared transmission cable 111, respectively. At night or in locations such as tunnels where no external light is available the FM transmitter 90 is powered by the secondary battery 98.

Figure 9:
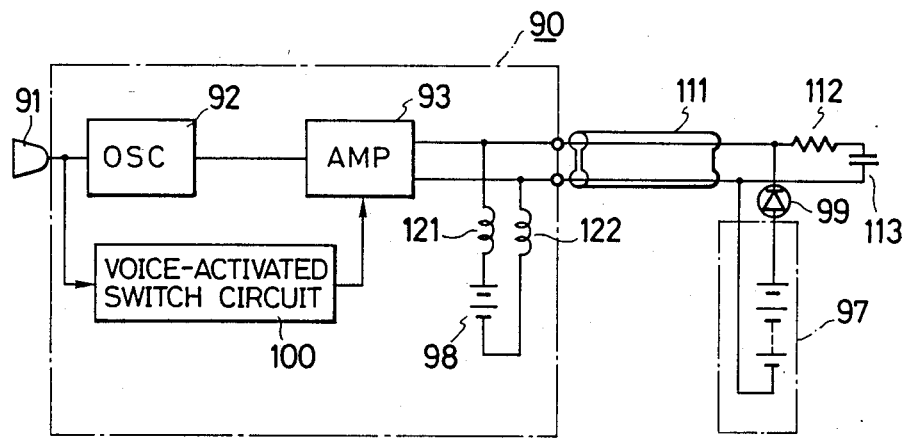
FIG. 9 is a block diagram of the FM transmitter in a hands-free telephone apparatus according to the sixth embodiment of the invention.

FIG. 9 is a block diagram of another embodiment of the FM transmitter. In this embodiment, the voice-activated switch circuit (VOX circuit) 100 is added in the FM transmitter 90 shown in FIG. 8. The hands-free person's voice is converted by the EC microphone 91 to an electrical signal which is detected by the VOX circuit 10, and control is applied so that the buffer amplifier 93, hence the FM transmitter 90, only operates while this signal is detected. Current drain from the secondary battery 98 can thus be reduced when the hand-free telephone is not in use.

In the preceding embodiments shown in FIGS. 7, 8 and 9 the leakage transmission cable was terminated by a terminating resistor, but this resistor can be omitted without critical effect. Also, the leakage transmission cable was described as a paired transmission cable, but other cables capable off supplying DC power and acting as an antenna can be used as well.

What is claimed is:

1. A vehicular hands-free telephone apparatus comprising
    a microphone for converting an acoustic signal to an electrical signal,
    an FM transmitter for generating a frequency-modulated radio signal in response to the output of said microphone,
    a transmitting antenna for transmitting in a vehicle said radio signal generated from said FM transmitter,
    a solar battery for converting light energy to electrical energy and providing operation power to said FM transmitter, said solar battery being mounted on a windshield of said vehicle,
    a receiving antenna for receiving said radio signal transmitted from said transmitting antenna,
    a receiver for receiving and frequency-demodulating said radio signal received by said receiving antenna, and
    a transceiver for transmitting the output of receiver outside of said vehicle,
    wherein said microphone, transmitting antenna and FM transmitter are built in a sun visor of said vehicle.

2. A vehicular hands-free telephone apparatus according to claim 1, wherein said operating power is provided from said solar battery to said FM transmitter through said transmitting antenna.

3. A vehicular hands-free telephone apparatus according to claim 1,
    wherein said receiving antenna is a leakage-type paired transmission cable.

4. A vehicular hands-free telephone apparatus according to claim 1,
    wherein said microphone has both forward and rear directionality.

5. A vehicular hands-free telephone apparatus according to claim 1,
    wherein said microphone is an electret capacitor microphone.

6. A vehicular hands-free telephone apparatus according to claim 1,
    wherein said FM transmitter includes a voice-activated switch circuit for enabling said FM transmitter only when a voice signal is detected.

7. A vehicular hands-free telephone apparatus according to claim 1,
    wherein said transmitting antenna is terminated at its end by a terminating resistor matched to the impedance of said paired transmission cable.

8. A vehicular hands-free telephone apparatus according to claim 1,
    wherein said apparatus further comprises a secondary battery which is charged by said solar battery.

9. A vehicular hands-free telephone apparatus according to claim 1,
    wherein a said secondary battery is connected so as to be charged by said solar battery through at least one reactance.

10. A vehicular hands-free telephone apparatus according to claim 1,
    wherein said secondary battery is charged by said solar battery through a diode for blocking a reverse current.

11. A vehicular hands-free telephone apparatus according to claim 1,
    wherein said transmitting antenna includes a DC blocking capacitor having a sufficiently small impedance value at the frequency of the transmitted radio signal.

12. A vehicular hands-free telephone apparatus according to claim 1,
    wherein said microphone is built in a sun visor of said vehicle and at least part of said sun visor disposed in front of said microphone is made of a permeable material that does not obstruct acoustic input.

13. A vehicular hands-free telephone apparatus according to claim 1,
    wherein said receiving antenna is a loop antenna mounted inside a phone base which includes said receiver.

14. A vehicular hands-free telephone apparatus according to claim 1,
    wherein said FM transmitter includes a circuit for rejecting higher harmonics in said frequency-modulated radio signal.

* * * * *